United States Patent [19]

Moyer et al.

[11] Patent Number: 4,962,579

[45] Date of Patent: Oct. 16, 1990

[54] TORQUE POSITION MAKE-UP OF TUBULAR CONNECTIONS

[75] Inventors: Mark C. Moyer, Missouri City, Tex.; James B. Day, New Orleans, La.; Alan J. Hirshberg, Houston, Tex.

[73] Assignee: Exxon Production Research Company, Houston, Tex.

[21] Appl. No.: 415,473

[22] Filed: Oct. 2, 1989

Related U.S. Application Data

[63] Continuation of Ser. No. 239,874, Sep. 2, 1988, abandoned.

[51] Int. Cl.$^5$ .............................................. B23Q 17/00
[52] U.S. Cl. ...................................... 29/407; 285/93; 285/334
[58] Field of Search .................... 29/407, 428; 285/93, 285/333, 334

[56] References Cited

U.S. PATENT DOCUMENTS

| | | | |
|---|---|---|---|
| 1,942,518 | 6/1933 | Protin | 285/334 |
| 1,985,916 | 1/1935 | Coates et al. | |
| 3,368,396 | 2/1968 | Van Burkleo et al. | |
| 3,468,563 | 9/1969 | Duret | 285/334 |
| 3,596,718 | 8/1971 | Fish et al. | |
| 3,603,144 | 9/1971 | Smith | |
| 3,606,664 | 9/1971 | Weiner | |
| 3,693,727 | 9/1972 | Bell | |
| 3,730,286 | 5/1973 | Weiner | |
| 3,745,820 | 7/1973 | Weiner | |
| 4,127,927 | 12/1978 | Hauk et al. | 29/407 |
| 4,154,466 | 5/1979 | Simmons | 285/334 |
| 4,170,163 | 10/1979 | Payne | |
| 4,199,032 | 4/1980 | Weiner et al. | |
| 4,305,472 | 12/1981 | Brossette | |
| 4,317,585 | 3/1982 | Boice | |
| 4,438,953 | 3/1984 | Timme, Jr. | |
| 4,655,159 | 4/1987 | McMills | |
| 4,738,145 | 4/1988 | Vincent et al. | |
| 4,835,873 | 6/1989 | Weems | 33/21.3 |

FOREIGN PATENT DOCUMENTS

1308337 2/1973 United Kingdom .

OTHER PUBLICATIONS

*Investigation of API 8 Round Casing Connection Performance*, by W. T. Asbill, P. D. Pattillo and W. M. Rogers; 2nd International Symposium on Offshore Mechanics and Acrtic Engineering, Energy Sources Technology Conference and Exhibition, Houston, Tex., 1/30/83-2/3/83.

*Effect of Changing Diameters Analyzed*, by T. L. Blose and K. T. Chang; Oil and Gas Journal, Oct. 1, 1984.

(List continued on next page.)

Primary Examiner—Mark Rosenbaum
Assistant Examiner—I. Cuda
Attorney, Agent, or Firm—Pravel, Gambrell, Hewitt, Kimball & Krieger

[57] ABSTRACT

Threaded pipe sections are connected to form a tubular joint having proper sealing positioning at proper make-up torque. This improved connection includes a first pipe section having a registry mark of a prescribed width at a predetermined position on its exterior surface for the proper axial engagement of the pin member with the coupling or box member. This position is principally determined from finite element analysis. This position is the same for all pin members of a similar size, grade, weight and thread form and therefore can be applied with a template. The pin member and box member are continuously threaded together up to a minimum of an empirically predetermined torque range. This torque range is predetermined by a combination of finite element analysis and experimentation of representative joints for a certain type, size, weight and grade of pipe section. If required, the range is adjusted by empirically determined friction factors to account for different platings, surface treatment and lubricants. While inexpensive, this improvement provides a simple method to visually determine on the rig floor or at the pipe rack whether the joint is properly made up to thereby provide effective sealing of the API tapered threaded joint.

11 Claims, 2 Drawing Sheets

OTHER PUBLICATIONS

*Finite Element Analysis of Casing Threads*, by W. R. Barry; Petroleum Mechanical Engineering Conference, Tulsa, Okla., 9/21/75–9/25/75.

*New Concepts for Load Transfer in Threaded Connections*, by K. Ueno, G. C. Dearden, J. K. Duxbury, and T. Maguchi; 18th Annual Offshore Technology Conference, Houston, Tex. 5/5/86–5/8/86.

*New Findings on Leak Resistance of API 8-Round Connectors*, by B. E. Schwind and G. R. Wolley; 61st Annual Technical Conference and Exhibition of the Society of Petroleum Engineers, New Orleans, La., 10/5/86–10/8/86.

*Analytical Investigation for the Performance Properties of Oil and Gas Well Pipe Connections*, by T. Mimaki, Nippon Steel Corporation.

*Overview of ABAQUS Applications at Exxon Production Research*, by A. B. Potvin, 2nd Annual ABAQUS User's Conference, Stresa, Italy, 5/25/89.

*New Make-Up Method Improves API Connection Reliability*, Ocean Industry, p. 39, vol. 24, No. 6, Jun. 1989.

J. B. Day, M. C. Moyer, A. J. Hirshberg, "New Makeup Method for API Connections", SPE/IADC 18697.

"KC Convertible Coupling System for API Connections", brochure by Thread Masters, Inc.

Recommendations for Running Big Omega Casing, Mannesmann/Röhrenwerke, Jan. 1985.

TORQUE POSITION MAKE-UP OF TUBULAR CONNECTIONS

This application is a continuation of application Ser. No. 239,874, filed on Sept. 2, 1988, abandoned.

BACKGROUND OF THE INVENTION

1. Field of the Invention

This invention relates to the field of tubular connections and methods for connecting tubular members, particularly for oilfield connections of tapered threaded pin and box members.

2. Background Description

Pipe sections used in oil fields (for example long sections of well casing or tubing) usually have a tapered, exteriorly-threaded male end called a pin member. Such pin members are threaded into couplings, collars or integral female pipe sections, their threaded ends are called a box member. These box members have an interiorly-threaded tapered thread corresponding to their respective pin members.

A dominant type of connection for these joints is the American Petroleum Institute ("API") threaded and coupled connection that achieves its assembly without torque shoulders. These tapered connections provide increasing bearing stresses to provide the seal between the pin member and box member with increasing engagement produced by rotational torque. It is well known in the petroleum industry that the performance of an API connection is highly dependent on the make-up assembly (engagement) condition of the joint, and therefore it is important to determine if the Joint is made-up properly. Assembly conditions include friction-related factors such as thread dope, plating type and thickness, surface finishes, eccentricity, ovality, impurities (dirt or rust) and external factors such as stab alignment and wind loading that occur at the well site.

Several types of methods nave been used to monitor and control make-up of oilfield tubular connections. One type of method is the "torque-only" method based upon the read-out of a load cell attached to the Joint or power make-up tongs and calibrated for torque. This method has limitations because it does not provide enough information to distinguish quality control problems such as out-of-tolerance threads, cross-threading, or galling.

A second method, "torque-turn", requires sophisticated electronics including a computer and sensors to monitor both the torque and turns which add to operational costs and delay the running time of the pipe sections. The "torque-turn" method is extremely sensitive to a reference torque which is a relatively low value, typically 10 percent of the minimum torque. This torque is sometimes determined by API torque recommendations. After this reference torque is reached, a predetermined number of turns are counted in the make-up of the tubular connection. If a false reference torque occurs to activate the turn counter because of one of the above described quality control problems or assembly conditions, an improper Joint make-up will result. An example of "torque-turn" monitoring is described in U.S. Pat. No. 3,368,396 to Van Burkleo et al. isused Feb. 13, 1968.

A third method is where the torque imposed on premium thread connections between tubular joints is monitored and plotted as a function of time rather than the number of turns. In this manner, the torque at which shoulder by metal-to-metal sealing contact is achieved during make-up of the connection can be detected. Further, torque response of the connection after shoulder may be monitored. An example of this kind of "torque-time" monitoring is described in U.S. Pat. No. 4,738,145 to Vincent et al. issued April 19, 1988.

Neither the torque-only, torque-turn nor the torque-time methods address the issue of allowing the operator to determine the amount of pin member axial engagement or positioning into the box member upon make-up of the joint. This is important in determining the amount of radial thread interference and whether the ends of the members have undesirably "butted" together, thereby restricting the bore of the pipe sections or whether there is sufficient thread engagement to withstand subsequent pressure and tensile loading.

U.S. Pat. No. 4,127,927 to Hauk et al. issued Dec. 5, 1978 discloses a fourth method that uses a combination of torque ranges and axial positioning to determine proper joint make-up In the axial relative positioning of the pipe sections, a hand tight plane is used as a reference for determining the position of a mark or marks on the pipe section(s). When in the hand tight engagement, the threads have been interengaged to a point where they are in intimate contact but without deformation, preferably reached between 25 to 50 foot pounds. Experience has shown that these relatively low reference torques result in significant variations, even on virtually identical connection specimens.

Hauk '927 discloses a complicated and expensive apparatus, preferably used at the wellsite, that gages this hand tight plane reference on each individual pin member and then marks each pin member a desired distance from the predetermined hand tight plane. The desired distance from the hand tight plane is determined empirically by making up numerous joints of each type, grade and size of pipe. Because of the variables found in the manufacturing tolerances in tubular connections each tubular joint could have a different hand tight plane reference and therefore a different position on the pipe section for the mark. As is now apparent, Hauk's method requires a time consuming analysis for the marking of each pin member prior to the initial running of the string of pipe sections.

Additionally, the Hauk method uses standardized make-up torques established by the API for each size, weight and grade of casing and tubing. (Hauk, column 1, lines 43–46; column 12, lines 45–57; column 13, lines 35–42.)

Hauk method (as disclosed in column 14, line 26 to column 15, line 16) teaches torquing a collar upon the pin member until the measured API torque reaches a preselected value. The collar end is then examined for registry with a painted-on line. This painted-on line is applied by reference to the gage (hand tight plane). The torque range is 0.75 to 1.25 times (x) the API optimum torque for the size, weight and grade of pipe. (Hauk column 14, lines 9–14.) In Hauk both torque and degree of engagement are monitored; torque by means of a torque gage and position by means of the gage-referenced mark.

Even while using these above methods for making up joints, the industry still suffers problems when forming the joints. These problems include the influent and effluent leakage because of lack of good sealing in improperly made-up joints.

There has been a long-felt need in the industry for a simplified method of determining in the field the propriety of joint make-up visually, thereby avoiding the need for complex instrumentation such as used in the "torque-turn" or "torque-time" methods or the need to calibrate each individual pin member for proper joint make-up as in the Hauk method.

It would greatly simplify field operations in terms of time and economy if a method of determining proper joint make-up could be devised which permitted the standardizing of the marking or registering on a pipe section for a certain type, size, weight and grade of pipe sections, thereby eliminating the undesirable hand tight plane reference and the highly variable reference torque, in combination with an empirically determined torque range for a certain type, size, weight and grade of pipe sections to achieve a proper joint make-up.

SUMMARY OF THE INVENTION

Briefly, the invention includes an improved method of connecting threaded pipe sections to form a tubular joint having proper sealing positioning at proper make-up torque. This improved connection comprises a first pipe section having a registry mark of a prescribed width at a predetermined position window on the first section measured a distance from the end of the pin member. This predetermined position window is the same for all pin members of a similar size, grade, weight and thread type (or form) and therefore the marks can be applied with a simple template prior to the make-up of the joint. The position window is principally determined from finite element analysis.

The pin member and box member of a second pipe section are then threaded or screwed (helically rotated) together up to a minimum of an empirically predetermined torque range. This torque range is predetermined by testing and/or finite element analysis of representative joints of a certain thread type, size, weight, and grade of pipe section. If required, the torque range is adjusted by empirically determined friction factors.

If upon make-up, the joint is visually inspected on the rig floor to be within the proper position and within the proper torque range, the joint is acceptable.

BRIEF DESCRIPTION OF THE DRAWINGS

The objects, advantages and features of the invention will become more apparent by reference to the drawings which are appended hereto and wherein like numerals indicate like parts and wherein an illustrative embodiment of the invention is shown in which.

DESCRIPTION OF THE INVENTION

General Description of the Method

Figure 4:
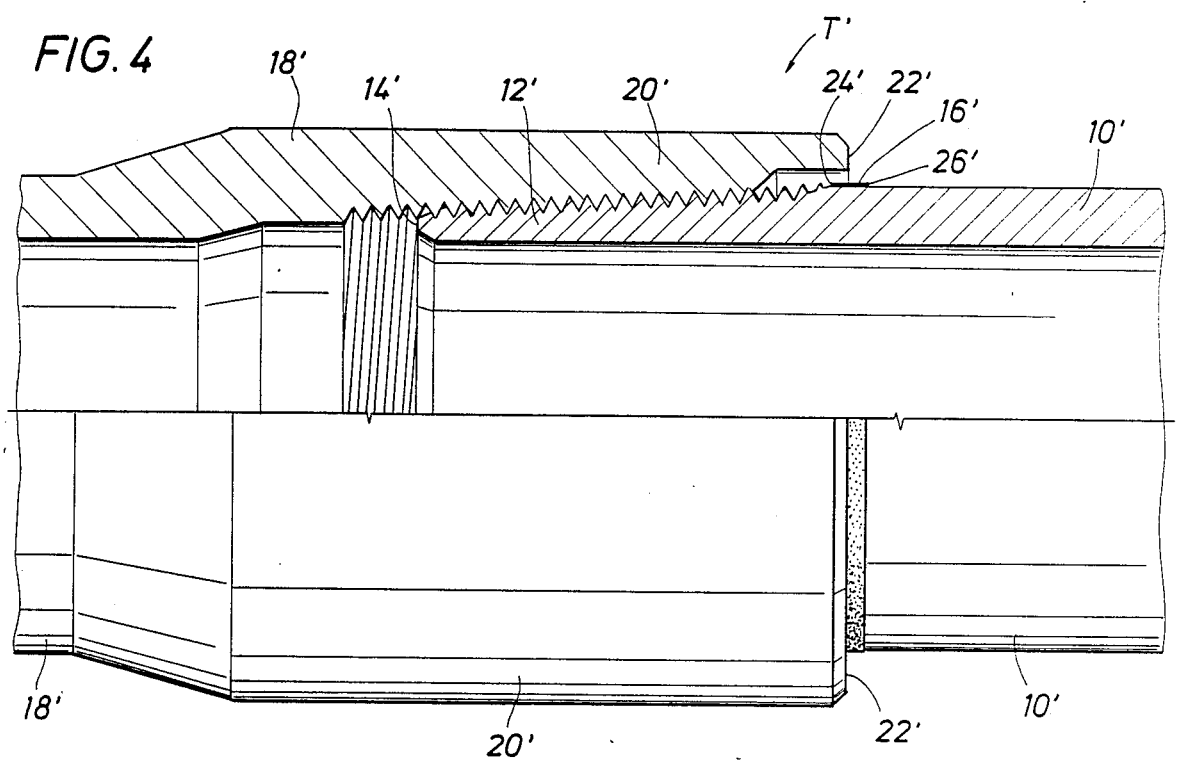
FIG. 4 illustrates a made-up integral joint shown in partial section view to show the proper positioning of the marking on the pin member relative to a box member end.

A tubular joint T embodying the present invention is shown in detail in FIGS. 1, 4 and 5 and will be discussed in detail below. The present invention can be used with tubing or casing. It is to be understood that the joint can be used with a coupling, collar or conventional box member as illustrated in the figures.

The present invention is advantageously used with a tapered threaded and coupled connection that achieves its connection without internal, external or mid-section torque shoulders or without special threading such as the wedge thread manufactured by the Hydril Company of Houston, Texas. This tapered connection, as shown in FIGS. 1, 4 and 5, achieves its desired sealing at proper axial positioning at proper make-up torque.

A first pipe section 10A includes an externally threaded pin member 12 having a face 14 at its end. The first pipe section 10A is provided with a registry mark or window 16 at a predetermined position on the exterior surface of the section 10A, as will be discussed below in detail. This position for the mark 16, preferably a painted band with sharp contrast to the pipe background, would be uniform for all pin members of a similar size, grade, weight, and thread type. A second pipe section or coupling 18 with length $N_L$ includes two corresponding threaded box members 20A and 20B having respective faces 22A and 22B at their ends, as shown in FIG. 1. The improved method includes continuously screwing (or helically rotating) the pin member 12 and the box member 20A of pipe coupling 18 together up to a minimum of an empirically and/or analytically pre-determined torque range.

The tubular joint is then observed and if the face 22A of the box member 20A is properly positioned relative to the registry mark 16 on the pipe section 10A, the joint is acceptable and make-up is terminated. If the face 22A has not reached the edge 24 of registry mark 16, the torque is increased until either the face 22A progresses into the band (between edges 24 and 26) of the mark 16 or until maximum torque occurs. If the face 22A enters the band of the mark 16 at a torque between the empirically and/or analytically determined minimum and maximum defined torque values, the joint connection is acceptable.

The other pipe section 10B in coupling 18 is in like fashion properly connected to its box member 20B. Also, the integral joint connections -f FIGS. 4 and 5, having like numerals indicating similar parts and shown with a prime indicator, are similarly connected with this novel method.

Figure 5:
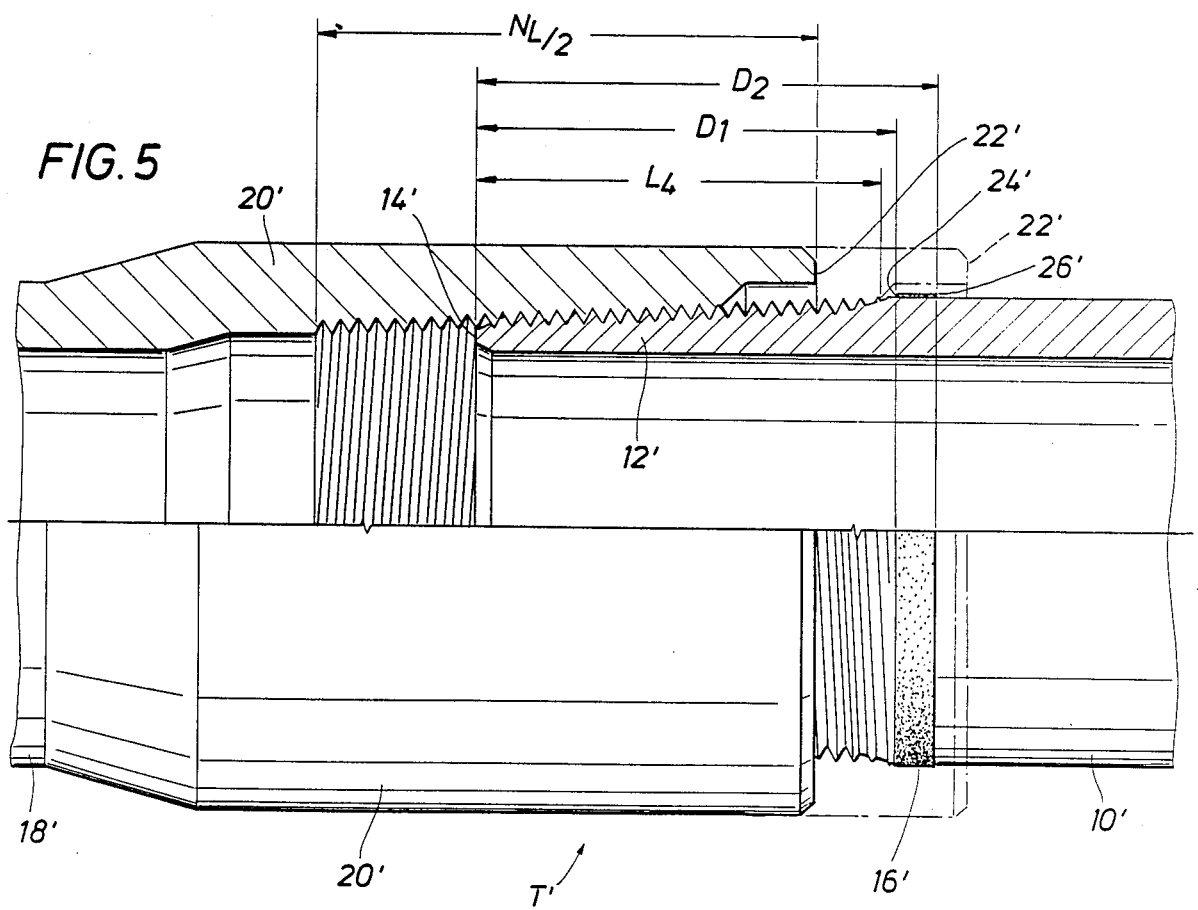
FIG. 5 shows a view similar to FIG. 4 where the pin member is not properly positioned relative to the box member ends shown in solid lines or in phantom view.

As shown in FIG. 5, if the face 22' (as shown in solid lines) does not reach the edge 24' of the mark 16' when the maximum torque is achieved, the joint is rejected. Also, as shown in FIG. 5, if the face 22' (as shown in dashed lines) has progressed past the edge 26' prior to minimum torque being reached, then the make-up is terminated and the connection is rejected.

As can be seen by the above description, this is a very simple and low cost method of ensuring proper make-up of connections while eliminating the problems of the past. A significant advantage to the method is that the registry markings allow the operator to visually determine the amount of pin member engagement into the coupling or box member. Furthermore, there is no dependence on relatively low and highly variable reference torque values.

Another important distinction of this method is noting that the pipeyard or laboratory "buck on" torque may be different from the rig floor make-up torque. The "buck-on" machine grips both the pipe sections outside surfaces and effectively makes the box member stiffer, typically resulting in higher torque than the rig floor make-up (often referred to as floating or free make-up) where only the pin member pipe sections are gripped. Although these two torque operations require different torque values, the registry marks remain identical because the needed threaded axial engagement remains the same. Therefore, the thread torque values can be prescribed for specific torque operation. In practice, this has usually only affected the above discussed minimum torque values.

Positioning of Registry Mark

The present invention differs from the prior art in that the make-up position is principally determined from finite element analysis (FEA) and then confirmed through experimentation.

As previously discussed, the registry mark 16 is preferably painted on the pipe section 10. As shown in FIGS. 1 and 5, the edges 24 and 26 of mark 16 are determined by calculating the below equations for $D_1$ and $D_2$.

$$D_1 = L_4 + C_1$$

$$D_2 = (N_L/2) - C_2$$

$L_4$ = API or manufacturer's thread length runout
$N_L$ = API or manufacturer's coupling length
$C_1$ = sealing constant usually determined by FEA bearing contact pressures being greater than internal fluid pressure
$C_2$ = deformation constant usually determined from FEA stress results and/or empirical tests for galling limit These equations solved for $D_1$ and $D_2$ provide the width of the registry mark 16 that would be exactly the same for a given order of pipe (size, weight, thread type and grade).

The dimensions $D_1$ and $D_2$ are therefore determined by a combination of stress calculations, connection geometry, and finite element analysis to generate sufficient bearing pressure to resist leakage while providing sufficient engagement to prevent jump-out and to induce a prescribed stress or strain limit.

Figure 1:
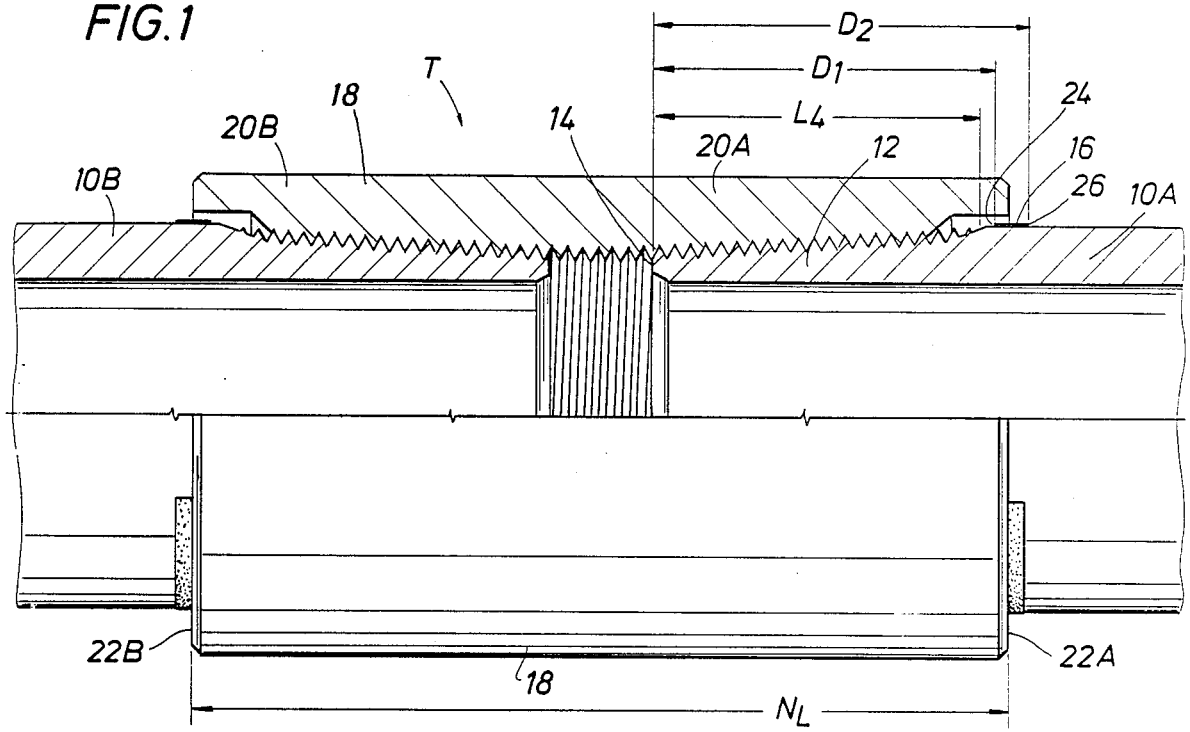
FIG. 1 illustrates a made-up coupling and two pin members shown in partial section view which shows the proper positioning of the respective markings on both pin members relative to the coupling.

More particularly, $L_4$ is, as shown in FIGS. 1 and 5, the length of the thread runout of the pin member 12. $N_L$, as shown in FIG. 1, is the API or manufacturer's coupling length. $N_L/2$, as shown in FIG. 5, is measured as shown for a conventional (integral) box member. The two constants, $C_1$ and $C_2$, for sealing and deformation, respectively, are also determined for a given order of pipe.

$C_1$ is determined by using advanced nonlinear finite element analysis (FEA) modeling of the connection. The FEA quantifies the bearing contact pressures between the thread forms of the pin and box members. Successively increasing axial positions are modeled until a sufficient bearing contact pressure (even under tensile loading) is identified. The key assumption is that the bearing contact pressure determined from the FEA model must be greater than the internal (or external) fluid pressure that is to be sealed against. The effects of partial pressure penetration into the thread helix are included in the model. $C_1$ is then verified by full-scale testing. $C_1$, therefore, is used to define the minimum axial engagement, and thus the beginning of the position window.

$C_2$ is determined by a combination of advanced nonlinear FEA modeling of the connection and experimentation. The FEA model is used to determine the stress and strain states in the connection for a given axial position. If the stress and strain states are too high, in relation to the material yield strength and yield strain, $C_2$ is increased until a satisfactory stress-strain state (i.e. limit) is identified by the FEA model. This value is then verified by full-scale testing. However, the full-scale torque testing is also used to establish the galling limit of the connection, that is, the point of engagement where thread seizure and tearing occurs. The lesser amount of axial engagement (or larger value of $C_2$) as determined from the two limits is used to define the maximum axial engagement, and thus the end of the position window, in most cases, for API connections, $C_2$ will be equal to the length of one thread pitch which has been found to provide a sufficient buffer against over make-up and interference with a subsequent pin being engaged from the other side of the coupling.

Nonlinear finite element analysis for threaded connections using a version of the ABAQUS general-purpose finite element program is a key tool used to determine the position ranges. See ABAQUS User's Manual, Version 4-6-58, Hibbitt, Karlsson, and Sorensen, Inc. Providence, Rhode Island, May 1984. The ABAQUS general purpose finite element computer program is commercially available to the public.

There are three nonlinear phenomena that must be modeled to analyze the performance of threaded connections accurately. These are (1) material constitutive behavior (plasticity), (2) finite deformation geometry, and (3) surface contact between the pin member and coupling or box member threads.

An important assumption used in the sealability analysis is that thread compound seals the helical paths formed by crest-to-root clearances at make-up and will continue to seal under loading provided that the crest-to-root clearance volume does not increase significantly.

The sealability of a connection can be improved by determining the amount of make-up that generates sufficient thread flank contact stresses to prevent the initiation of pressurized fluid penetration into the thread form even under subsequently applied loads.

In defining the word "mark" or "marking", etc., as used in the appended claims, it is intended that they include not only painting, stencil, die stamp or inking onto the pipe, but also other types of indicia. Thus, for example, a strip of tape—when adhesively applied to a pipe is a "mark" in the present sense. Also, scratches, grooves, scribes, etc. are "marks". The mark need not be visible to the eye, so long as it may be sensed at the well site by appropriate apparatus. The "mark" may be magnetic, radioactive, or whatever is desirable. It is to be understood that the mark, though illustrated as continuous, may be and preferably is a dashed mark.

Also it should be understood that the second pipe section as defined in the claims could include a previously joined first and second pipe section as is inherent in the running of the pipe sections in the drilling and workover operations.

Template

Figure 2:
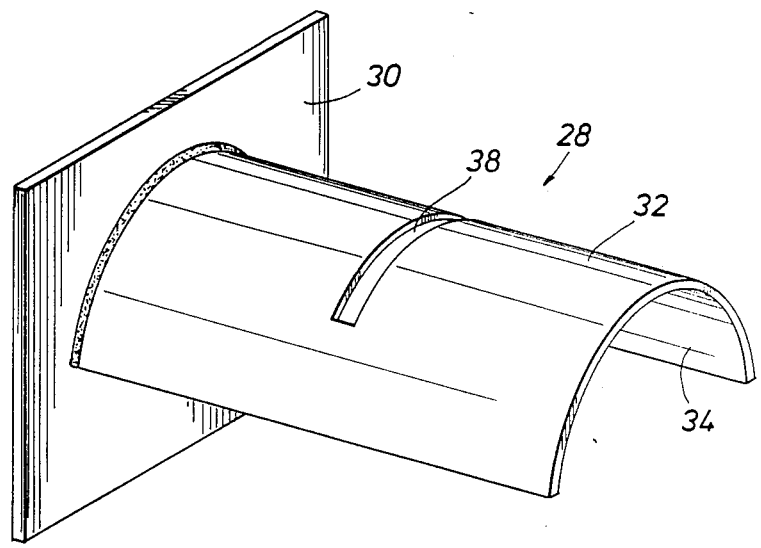
FIG. 2 illustrates a perspective view of the template of the present invention.
Figure 3:
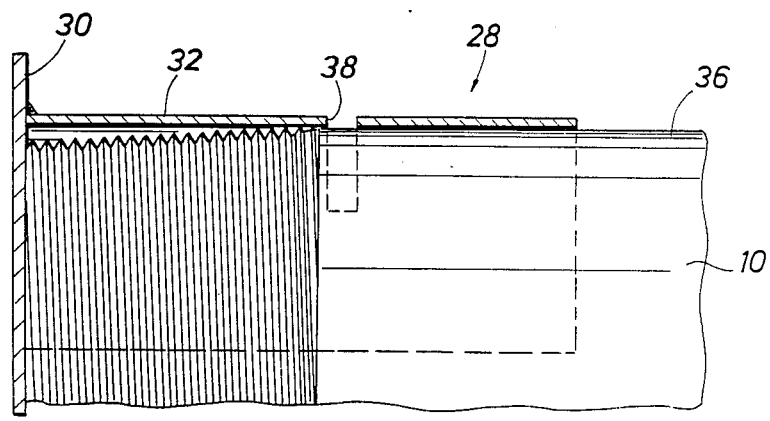
FIG. 3 illustrates the template of FIG. 2 positioned relative to a pin member of the present invention to mark the joint.

Advantageously, a simple template 28, as shown in FIGS. 2 and 3, can be used to mark a given order (same thread type, size, weight and grade) of pipe. The template 28 includes a rigid, preferably steel, plate 30 attached perpendicular to a piece of curved stainless steel sheet metal 32, preferably 19 gage, having an inner surface configuration 34 corresponding to the outer surface of the first pipe section 10, as best shown in FIG. 3. It has been found that the welding, soldering or brazing should not be provided on the inside surface of the section but should be provided on the external surface of the curved surface. Additionally, the curved sheet metal 32 has an opening or position window 38 spaced a distance $D_1$ and $D_2$, as defined above, from the rigid plate 30 and is preferably approximately- two (2) inches long (circumferential direction). The described template could provide a dashed mark (as shown in FIG. 1), a single marking or a continuous marking (as shown in FIGS. 4 and 5) depending upon the number of times and where the template is rotated and the opening subsequently painted. Preferably, two (2) to four (4) marks each being the preferred 2″ long are painted on each pin member pipe section 10 for a 7-inch OD pipe but of course the number of marks will increase or decrease depending on the size of pipe and operator preference.

Torque Range

The torque range is basically established through experimentation with a representative sampling of a given connection size, weight, grade, plating and thread type or form. Torque values are measured that correspond to the analytically determined axial position values described previously (i.e. $D_1$ and $D_2$). These torque values are significantly higher and less variable than reference torque values used to begin counting turns or marking hand-tight planes as employed in other connection methods. The FEA model is compared against these sample tests to establish friction factors which can be used to predict torque ranges. Since the friction factors are reasonably similar over a relatively wide range of sizes, weights and grades, the amount of experimentation can be minimized by using FEA model predictions for the torque range. Empirical friction factor corrections are used to account for different platings and lubricants.

7-inch OD, 41 lb/ft, P-110, API LTC casing connection with an API nominal OD coupling example Based on physical testing and using the above discussed nonlinear finite element analysis of a 7-inch OD, 41 lb/ft, P-110, API LTC casing connection with an API nominal OD coupling, the below Table 1 was developed for make-up and running guidelines for that particular size, weight, grade, plating and thread type of pipe.

TABLE 1

Make-up and Running Recommendations
7-Inch OD, 41 lb/ft, P-110, API LTC
Casing Connection Nominal OD Coupling
Torque-Position Make-Up Values

|  | Minimum | Maximum |
|---|---|---|
| TIN-PLATED THREADS | | |
| TORQUE (Ft-lbs) | 7,650 | 11,000 |
| Position (in) | $D_1 = 4.063$ | $D_2 = 4.250$ |
| PHOSPHATE-COATED THREADS | | |
| TORQUE (Ft-lbs) | 10,700 | 16,000 |
| Position (in) | $D_1 = 4.063$ | $D_2 = 4.250$ |

The torque-position values of Table 1 are based on (1) achieving thread flank bearing pressures necessary to seal the API-maximum internal pressure, (2) limiting von Mises equivalent stresses through the coupling wall to levels at or below the API minimum yield strength of the P-110 steel, and (3) experimentally verifying that thread galling does not develop in this torque-position range.

The make-up torques shown in Table 1 were developed by first analytically determining the make-up position, as discussed above, to provide adequate internal pressure and structural integrity. Then, through the combined results of testing and finite element analysis, the torques corresponding to the axial positions were determined.

A friction factor was empirically derived for the phosphatized threads and thereafter used in establishing the relationship between turns ±rom the analysis and the torque from the full-sale laboratory or field tests. This is shown mathematically in a simplified form as:

$$T = fKP_bD$$

where:
T = torque measured experimentally
f = friction factor (to be determined)
K = constant depending on connection geometry
$P_b$ = bearing contact pressure
D = axial position The make-up torques shown in Table 1 for connections with tin-plated coupling threads were developed in a manner similar to the connections with phosphatized coupling threads. The required make-up torques for the tin-plated couplings are approximately 70% of the torques for the phosphatized coupling.

Also an API 5A2 compound was applied to both pin member and box member or coupling threads.

Various modifications and alterations in the described methods will be apparent to those skilled in the art of the foregoing description which does not depart from the spirit of the invention. For this reason, these changes are desired to be included in the appended claims. The appended claims recite only the limitations of the present invention in the descriptive manner which is employed for setting forth the embodiments and is to be interpreted as illustrative and not limitative.

What is claimed is:

1. Method of connecting threaded pipe sections to form a made-up tubular joint having proper sealing positioning at proper make-up torque, the method comprising the steps of:

providing a first pipe section including a threaded pin member having a face at its end, the first pipe section having been marked to provide a registry mark of a prescribed width at a predetermined position measured a distance from the end of the pin member, said predetermined position being uniform for any pin member of similar size, grade, weight, and thread form, the distance being determined for a pin member of a particular size, grade, weight, and thread form prior to make-up of the joint, providing a second pipe section including a corresponding threaded box member having a face at its end, screwing the pin member and box member together continuously with a make-up torque to form a made-up tubular joint, determining that the made-up tubular joint is acceptable during the continuous screwing together of the pin member and box member when (1) the face of the end of the box member is properly positioned relative to the registry mark on the first pipe section, and (2) the make-up torque is within a predetermined make-up torque range, or determining that the made-up tubular joint should be rejected during the continuous screwing together of the pin member and the box member when either (1) the face of the end of the box member moves past the registry mark on the first pipe section when a minimum of the predetermined make-up torque range is applied to the joint; or (2) the face of the end of the box member does not move within the registry mark when a maximum of the predetermined make-up torque range is applied to the joint, and terminating the continuous screwing together of the pin member and box member when the made-up tubular joint is determined to be acceptable or to be rejected.

2. The method of claim 1 wherein the predetermined position of the registry mark of the first pipe section from the end of the pin member is determined by the following formulas:

$$D_1 = L_4 + C_1$$

$$D_2 = N_L/2 - C_2$$

$D_1$ = Distance from the pin end of the first pipe section to a leading edge of the registry mark
$D_2$ = Distance from the pin end of the first pipe section to a trailing edge of the registry mark
$L_4$ = API or manufacturer's thread length runout
$N_L$ = API or manufacturer's coupling length
$C_1$ = Sealing constant distance to generate sufficient thread flank contact stresses to prevent fluid penetration through axially engaged threaded pin and box members
$C_2$ = Deformation constant distance to prevent excessive plastic deformation in threaded pin and box members.

3. The method of claim 2 wherein the first pipe section is marked by providing a band between the $D_1$ distance from the pipe end of the first pipe section to a leading edge of the registry mark and the $D_2$ distance from the pin end of the first pipe section to a trailing edge of the registry mark.

4. The method of claim 1 wherein the first pipe section is marked with a band.

5. The method of claim 1 where the predetermined make-up torque range is determined by the steps of:

calculating a theoretical make-up torque required for proper sealing positioning for a certain type, size, weight, grade, and thread form of pipe section by finite element analysis, measuring an actual make-up torque required for proper sealing at an axially engaged position for a certain type, size, weight, grade, and thread form of pipe, and comparing the theoretical make-up torque and the actual make-up torque to establish a corresponding friction factor for use in predicting required make-up torque for a wide range of pipe sizes, weights, and grades without requiring actual make-up torque measurements.

6. The method of claim 1 wherein the registry mark is applied by the steps of positioning a template having an opening positioned a fixed distance from an abutment plate and said abutment plate being held against the end of the pin member, and applying a mark through the opening on the first pipe section.

7. The method of claim 1 wherein said second pipe section is a coupling.

8. Method of connecting threaded pipe sections to form a made-up tubular joint having proper positioning at proper make-up torque, the method comprising the steps of:

providing a first pipe section including a threaded pin member having a face at its end, providing a second pipe section including a corresponding threaded box member having a face at its end, marking the first pipe section with a registry mark at a predetermined position a measured distance from the end of the pin member, the predetermined position being uniform for any pin member of similar size, grade, weight, and thread form, and being determined through finite element analysis modeling so that the registry mark may be used to indicate axial make-up positioning between the first and second pipe sections, screwing the pin member and box member together continuously with a make-up torque to form a made-up tubular joint, determining that the made-up tubular joint is acceptable during the continuous screwing together of the pin member and box member when (1) the face of the end of the box member is within the registry mark on the first pipe section, and (2) the make-up torque is within a predetermined make-up torque range, or determining that the made-up tubular joint should be rejected during the continuous screwing together of the pin member and box member when either (1) the face of the end of the box member moves past the registry mark on the first pipe section when a minimum of the predetermined make-up torque is applied to the joint; or (2) the face of the end of the box member does not move within the registry mark when a maximum of the predetermined make-up torque range is applied to the joint, and terminating the continuous screwing together of the pin member and box member when the made-up tubular joint is determined to be acceptable or to be rejected.

9. The method of claim 8 wherein the predetermined position of the registry mark of the first pipe section from the end of the pin member is determined by the following formulas:

$$D_1 = L_4 + C_1$$

$$D_2 = N_L/2 - C_2$$

$D_1$ = Distance from the pin end of the first pipe section to a leading edge of a registry mark $D_2$ = Distance from the pin end of the first pipe section to a trailing edge of a registry mark $L_4$ = API or manufacturer's thread length runout $N_L$ = API or manufacturer's coupling length $C_1$ = Sealing constant distance to generate sufficient thread flank contact stresses to prevent fluid penetration through axially engaged threaded pin and box members $C_2$ = Deformation constant distance to prevent excessive plastic deformation in threaded pin and box members.

10. The method of claim 8 wherein said second pipe section is a coupling.

11. The method of claim 8 where the predetermined make-up torque range is determined by the steps of:

calculating a theoretical make-up torque required for proper sealing positioning for a certain type, size, weight, grade, and thread form of pipe section by finite element analysis, measuring an actual make-up torque required for proper sealing at an axially engaged position for a certain type, size, weight, grade, and thread form of pipe, and comparing the theoretical make-up torque and the actual make-up torque to establish a corresponding friction factor for use in predicting required make-up torque for a wide range of pipe sizes, weights, and grades without requiring actual make-up torque measurements.

* * * * *